(12) United States Patent
Miller et al.

(10) Patent No.: US 6,918,624 B2
(45) Date of Patent: Jul. 19, 2005

(54) VEHICLE TAILGATE WITH SUPPLEMENTAL TAILGATE HAVING A FLIP OUT STEP

(75) Inventors: Scott Miller, Canton, MI (US); Stephen Bruford, West Bloomfield, MI (US); Kian-Huat Tan, Westland, MI (US); Herbert Gruber, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/969,413

(22) Filed: Oct. 20, 2004

(65) Prior Publication Data

US 2005/0093326 A1 May 5, 2005

Related U.S. Application Data

(60) Provisional application No. 60/515,521, filed on Oct. 29, 2003, provisional application No. 60/515,370, filed on Oct. 29, 2003.

(51) Int. Cl.⁷ .............................................. B60R 3/02
(52) U.S. Cl. ........................ 296/62; 296/26.1; 182/127; 280/166
(58) Field of Search ........................ 296/62, 61, 26.08, 296/26.09, 26.1; 182/129, 91; 280/163, 166

(56) References Cited

U.S. PATENT DOCUMENTS

| | | | |
|---|---|---|---|
| 4,624,619 A | 11/1986 | Uher | |
| 4,639,032 A * | 1/1987 | Barbour | 296/62 |
| 5,028,063 A * | 7/1991 | Andrews | 280/166 |
| 5,312,149 A | 5/1994 | Boone | |
| 5,468,038 A | 11/1995 | Sauri | |
| 5,478,130 A | 12/1995 | Matulin et al. | |
| 5,549,312 A * | 8/1996 | Garvert | 280/166 |
| 5,700,047 A | 12/1997 | Leitner et al. | |
| 5,788,311 A | 8/1998 | Tibbals | |
| 5,806,907 A | 9/1998 | Martinus et al. | |
| 5,816,638 A * | 10/1998 | Pool, III | 296/26.11 |
| 5,902,000 A | 5/1999 | Wold | |
| 5,988,725 A | 11/1999 | Cole | |
| 6,019,410 A | 2/2000 | Trostle et al. | |
| 6,045,172 A | 4/2000 | Thomas et al. | |
| 6,120,076 A | 9/2000 | Adsit et al. | |
| 6,364,392 B1 | 4/2002 | Meinke | |
| 6,422,342 B1 * | 7/2002 | Armstrong et al. | 182/127 |
| 6,425,618 B1 | 7/2002 | Garland et al. | |
| 6,454,338 B1 | 9/2002 | Glickman et al. | |
| 6,626,478 B1 | 9/2003 | Minton | |
| 6,676,182 B2 | 1/2004 | Fitts | |
| 2002/0070577 A1 * | 6/2002 | Pool et al. | 296/62 |

* cited by examiner

FOREIGN PATENT DOCUMENTS

DE  2745751  4/1979

Primary Examiner—Joseph D. Pape
(74) Attorney, Agent, or Firm—Gigette M. Bejin; Miller Lawgroup, PLLC

(57) ABSTRACT

A tailgate for a vehicle has a supplemental tailgate that retracts within the tailgate and is extendable therefrom in order to provide multiple assist functions. The supplemental tailgate includes a pivotable molding, which mounts on a movable frame portion, and a latching assembly. When pivoted, the pivotable molding releases the latching assembly, allowing the supplemental tailgate to be moved to various extended positions. When the movable frame portion is in an essentially fully extended position, it can be rotated downward relative to the tailgate and a flip step pivoted to a use position in order to provide an assist step function.

20 Claims, 8 Drawing Sheets

US 6,918,624 B2

VEHICLE TAILGATE WITH SUPPLEMENTAL TAILGATE HAVING A FLIP OUT STEP

CROSS REFERENCE TO RELATED APPLICATIONS

This application claims the benefit of United States provisional patent applications identified as Application No. 60/515,521, filed Oct. 29, 2003, and Application No. 60/515,370, filed Oct. 29, 2003, and are both incorporated herein by reference.

BACKGROUND OF INVENTION

The present invention relates to vehicle tailgates, and more particularly to vehicle tailgates that include a multi-function assembly extendable therefrom.

Conventionally, pickup trucks include a tailgate at the back of a bed that closes off a cargo box. Often times, the truck bed is not long enough to hold the cargo, so truck bed extenders have been developed. The truck bed extenders work in conjunction with the tailgate in order to provide additional length to the bed. Some designs for pickup truck bed extenders mount to the outside of the tailgate, which may be convenient for deployment and avoid concerns with deployment mechanisms, but they tend to interfere with cargo space in the box since the bed extender, when not in use, protrudes into the box. Moreover, it is typical for the vehicle operator to employ the extender only occasionally, so it is undesirable to have the extender exposed at all times, which detracts from the attractiveness of the vehicle.

Additionally, it is sometimes desirable to have an extender that can provide other functions in addition to a bed extender, such as an assist step type of function, (a downwardly extending structure from an open tailgate that can be stepped-on for assistance in entering the bed). While some externally mounted extenders provide such a function, they are, again, unsightly, even when not in use. Moreover, many of these designs are cumbersome and bulky, making them even more undesirable.

In attempts to overcome the drawbacks of the externally mounted bed extenders, there has been developed flush mounted extenders that are stowed in the tailgate when not in use. Some even provide for a downward rotation ability so the extender can be used as an assist step. Being out of sight when not in use presents a more attractive vehicle, but the part of the extender that acts as a step is generally much narrower than is desired for a step. This is due to the fact that it is narrower or only about the same width as the thickness of the tailgate in order to allow the extender to retract within and remain flush with the tailgate.

Another drawback with common bed extenders is that a desirable feature of conventional tailgates may be lost. That is, a conventional tailgate has an ornamental plastic tailgate molding mounted along its top surface. It is meant to provide a surface along which cargo can be slid into the bed without the concern of rusting due to paint being scraped off. Some bed extender designs interfere with or cause the elimination of this molding, further detracting from the appearance of the vehicle.

Thus, it is desirable to have a vehicle tailgate with a bed extender that overcomes the drawbacks of the prior art.

SUMMARY OF INVENTION

In its embodiments, the present invention contemplates a tailgate assembly for use with a motor vehicle having a pair of spaced, generally vertical side walls and a generally horizontal bed extending therebetween. The tailgate assembly has a tailgate frame defining a generally hollow cavity therein adapted to pivotally mount generally between the side walls and being operable in a generally horizontal open position. The tailgate assembly may also have a supplemental tailgate including a guide system secured generally within the hollow cavity, a movable frame assembly having two telescoping supports extendable from, pivotable relative to, and retained by the guide system, a cross member connected to the two telescoping supports and extending therebetween, and a flip step pivotally connected to the cross member, with the flip step pivotable between a first position resting against the cross member and a second position extending outward from the cross member.

An embodiment of the present invention also contemplates a supplemental tailgate assembly for use with a vehicle tailgate having a tailgate frame defining a generally hollow cavity therein. The supplemental tailgate assembly may also have a guide system including two hollow guide tubes adapted to be secured generally within the hollow cavity. The supplemental tailgate assembly also has a movable frame assembly having two telescoping supports, with each telescoping support extendable from, pivotable relative to, and retained by a respective one of the guide tubes; a cross member connected to the two telescoping supports and extending therebetween; and a flip step pivotally connected to the cross member, with the flip step pivotable between a first position resting against the cross member and a second position extending outward from the cross member.

An advantage of an embodiment of the present invention is that a supplemental tailgate that is able to retract within the vehicle tailgate can also be oriented to provide a step assist function with a step that has a desirable width for those employing this function. That is, the width of the step is that desired for vehicle users, but this wide step does not detract from the ability to retract the supplemental tailgate within the vehicle tailgate.

Another advantage of an embodiment of the present invention is that the supplemental tailgate, when in its retracted position during times of nonuse, will not detract from the attractiveness of the vehicle. Moreover, it can closely match the look of tailgates for similar trucks that do not have a supplemental tailgate, thus allowing for essentially the same appearance across that particular line of trucks.

A further advantage of an embodiment of the present invention is that the assist step is relatively simple mechanically, yet still convenient to deploy and use and to stow when finished using the supplemental tailgate.

An additional advantage of an embodiment of the present invention is that the highly ergonomic and esthetically pleasing supplemental tailgate assembly still allows for a multi-function bed extender. This supplemental tailgate assembly can be moved to different positions in order to be employed to extend the bed and operate as an assist step.

DETAILED DESCRIPTION

Figure 1:
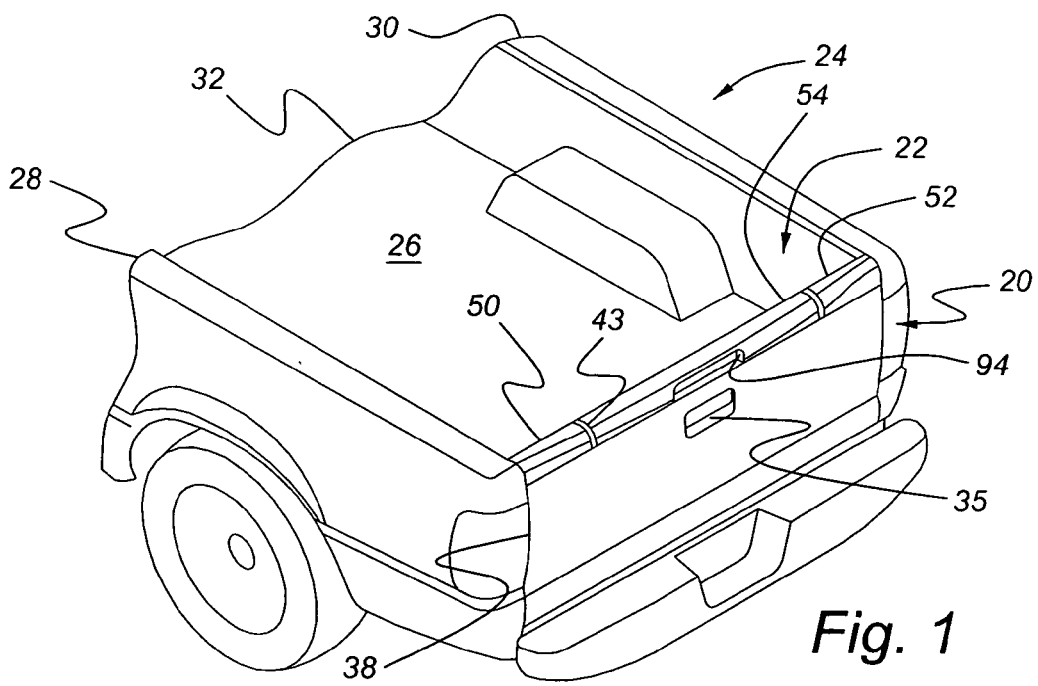
FIG. 1 is a perspective view of a rear portion of a vehicle having a tailgate, with the tailgate shown in a generally vertical, closed position, in accordance with the present invention.
Figure 2:
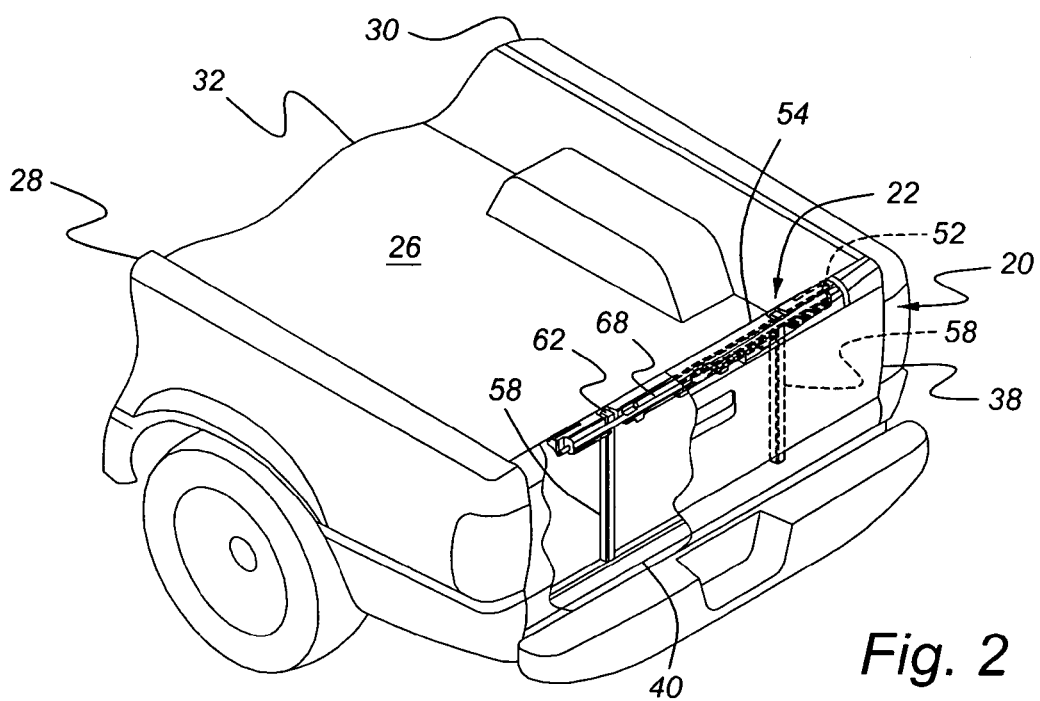
FIG. 2 is a partially cutaway perspective view similar to FIG. 1, with the cutaway area revealing the supplemental tailgate structure retracted into its stowed position within the vehicle tailgate.
Figure 3:
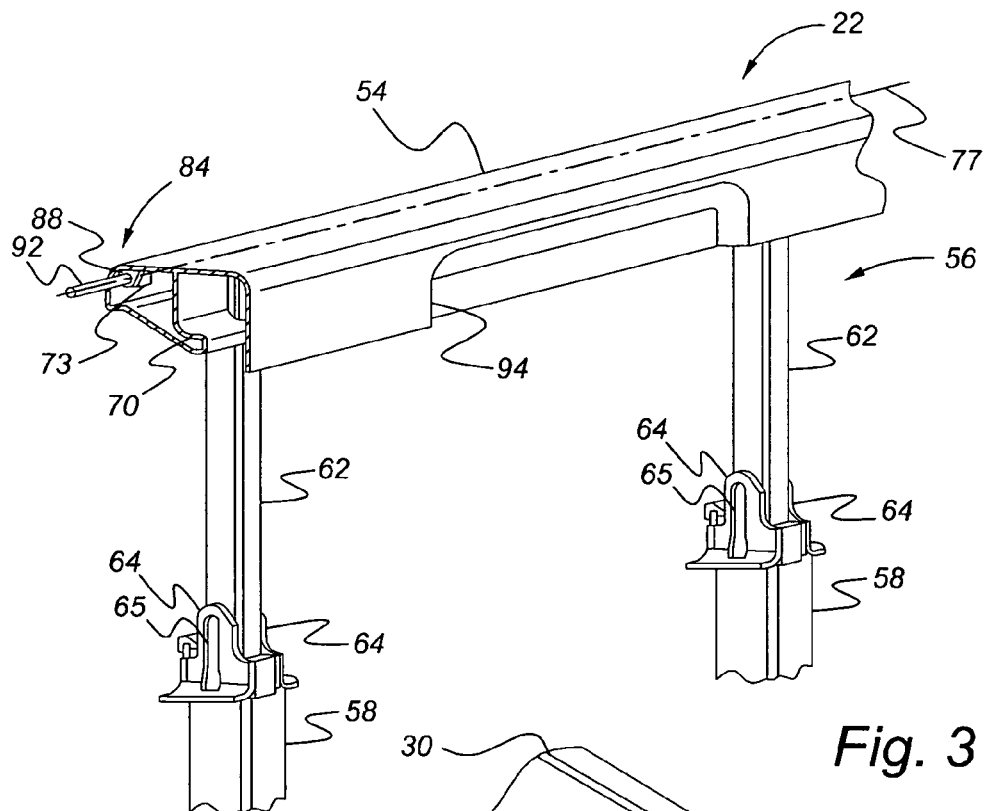
FIG. 3 is a perspective, partially sectioned view of the supplemental tailgate in accordance with the present invention.

FIGS. 1–12 illustrate a tailgate 20 that mounts to a vehicle 24—preferably a pickup truck. The tailgate 20 includes a supplemental tailgate 22 mounted therein. The vehicle 24 includes a box 26 that is defined by a left rear quarter panel 28, which forms a first vertical surface of the box 26; a right rear quarter panel 30, which forms a second vertical surface of the box 28; a bed 32, which extends between the two panels 28, 30 to form a cargo floor; and the tailgate 20, which is pivotable between a generally vertical closed position and a generally horizontal open position.

The tailgate 20 includes a pair of conventional tailgate hinges 34 that preferably cooperate with the side panels 28, 30, and a pair of tailgate supports 36, which support the tailgate 20 when in its horizontal position. A tailgate handle 35 mounts to an outer panel 38, and functions in a conventional manner. The tailgate release mechanism and handle 35, as well as tailgate latches, are conventional and well known in the art and so are not shown herein for clarity in describing the present invention.

The tailgate 20 is comprised of a tailgate frame 37 including the outer panel 38, which forms the outer finished surface of the tailgate 20, and a tailgate frame inner panel 40, which mounts to the outer panel 38 and forms the inner surface and sides 42 of the tailgate 20. A tailgate reinforcement channel 48 may mount along the top of the tailgate outer panel 38 and inner panel 40. The outer panel 38, inner panel 40 and reinforcement channel 48 combine to form a pair of upper surfaces with a gap 43 therebetween. Other tailgate reinforcement members (not shown) and brackets (not shown) may be mounted within the frame 37 to provide structural support to the frame outer and inner panels 38, 40. The tailgate frame 37 also includes a pair of structural stops 152 mounted near the top of the tailgate. A left tailgate molding 50 and a right tailgate molding 52 mount on top of the upper surfaces. They may be made of colored plastic that is the desired color of the parts; this eliminates the need to paint them. In this way, the tailgate moldings 50, 52 will help to prevent paint scratches on metal parts when cargo is being loaded over the top of a closed tailgate 20.

The components that make up the tailgate frame 37 are formed so that a hollow internal cavity is created. Within this cavity, the supplemental tailgate 22 is retained. The supplemental tailgate 22 includes a pivotable molding 54, a movable frame portion 56, and guide rails 58. The guide rails 58 are hollow, generally rectangular tubes that are fixed to the tailgate frame 37 and support the movable frame portion 56 as it is telescopically extended from and retracted into the guide rails 58.

Each guide rail 58 includes pivot brackets 64 mounted on top that cooperate with the movable frame portion 56 to allow for both pivoting of the movable frame portion 56 relative to the tailgate 20 and preventing the movable frame portion 56 from being separated from the guide rails 58. The pivot brackets 64 may be fastened to the reinforcement channel 48, and the bottoms of the guide rails 58 may be fastened to the inner panel 40 in order to help secure the guide rails 58 to the tailgate 20. Each of the structural stops 152, mentioned above, are located adjacent to a corresponding one of the pivot brackets 64.

The movable frame portion 56 includes a pair of support tubes 62 that are each received telescopically in a respective one of the guide rails 58. Each of the guide rails 58 may include a block spacer 55 mounted therein against which the support tubes 62 can slide. The block spacers 55 may be formed of plastic to minimize potential scratching of the support tubes 62 as they slide relative to the guide rails 58. Each of the support tubes 62 includes a hinge pin 66 that cooperates with slots 65 in the pivot brackets 64, when fully extended, in order to allow for pivoting of the movable frame portion 56 relative to the guide rails 58 while still allowing the guide rails 58 to retain and support the support tubes 62. The hinge pins 66 may be secured to the support tubes by welding, interference fit, or some other suitable means. Each of the support tubes 62 also connects to a corresponding one of the latching assemblies 60. The latching assemblies 60 releasably fix the support tubes 62 to a certain limited number of telescopically extended positions relative to the guide rails 58. When extended out partially, the guide rails 58 will hold the support tubes 62 parallel to it, thus creating a longer effective bed for the truck when the tailgate 20 is in its horizontal position.

Each of the movable frame portion's support tubes 62 are hollow so they can receive a respective one of the two latching assemblies 60 therein. More specifically, latch housings 78 extend through each of the support tubes 62 and connect, at their upper ends, to the lower ends of latch actuation rods 80 via retainer barrels 81. The upper ends of the latch actuation rods 80 are secured, via retaining clips 83, to release levers 82, which are part of the pivotable molding 54, in order to form a release hinge 84.

Even though, for some features of the supplemental tailgate 22, only the feature on the left or right side is shown, the supplemental tailgate 22 is generally symmetrical right to left, so the opposite side is just the mirror image of the feature shown on that first side. Accordingly, for the description herein, if the feature is shown on only a first side, the feature on the second, opposite side is presumed to be the mirror image of the feature shown on the first side.

The lower ends of the latch housings 78 connect to latch return springs 85, which, in turn, are connected to the hinge pins 66. Also connected to the hinge pins 66 are linear guides 89. The linear guides 89 may include sliders 91, which provide for surface contact with the inside of the guide rails 58. Alternatively, the linear guides and sliders may be replaced with roller guides and rollers (not shown) in order to provide a more smooth feeling motion when extending and retracting the support tubes 62 relative to the guide rails.

Each of the latch housings 78 also includes a longitudinally extending slot 93, within which is mounted a respective one of two latch blades 87. Each latch blade 87 is biased into its corresponding slot 93 by a latch blade spring 95. The springs 95 cause retention tabs 96, protruding from the latch blades 87, to extend through corresponding holes 97 in the support tubes 62. Also, when aligned, the retention tabs 96 are biased by the springs 95 to extend through engagement slots 98 in the guide rails 58 and through engagement slots 61 in insert plates 59. The insert plates may be secured to their respective guide rails 58 by detent covers 57. The engagement slots 61, 98 may be longer than the width of the corresponding retention tabs 96 and the insert plates 59 adjustable relative to their corresponding detent covers 57 in order to allow for small adjustments in the position of the support tubes 62 relative to the guide rails 58. This small adjustability may allow one to make sure that the top of the pivotable molding 54 is flush with the tops of the tailgate moldings 50, 52 when the supplemental tailgate 22 is in its stowed position. Each latch housing 78 also includes internal flanges 99, located within the slot 93, that engage with release ramps 100 on the latch blade 87.

The movable frame portion 56 also includes a cross member assembly 68 that connects to the tops of the support tubes 62. The cross member assembly 68 includes a support frame 70 and a step reinforcement 157. The cross member assembly 68 also includes pivot mounts 73 mounted on the support frame 70. The support frame 70 is formed strong enough to support the weight of one or more people standing on it. This way, when the movable frame portion 56 is extended out and pivoted downward toward the ground, the support frame 70 can be used as a step.

Pivotally connected to the support frame 70 is a flip step 153. The flip step 153 includes a hinge assembly 159 made up of hinge bosses 155 that are connected to step hinges 156 via hinge pins 158. The step hinges 156 are secured to the step reinforcement 157, thus allowing the flip step 153 to pivot relative to the cross member assembly 68. The shape of the hinge bosses 155 and step hinges 156 are such that they will limit the extent to which the flip step 153 can pivot away from the support frame 70. The limit to the extent of pivoting is preferably enough to cause the flip step 153 to extend parallel and coplanar with the support frame 70, thus creating a wider effective step for one to stand on. A pair of flip step springs 154, in tension, are each connected between the cross member assembly 68 and the flip step 153. The size and orientation of the springs 154 is such that the springs will bias the flip step 153 in either its fully retracted position (against the support frame 70) or its fully open position (pivoted away from the support frame 70). While the flip step 153 is shown in a location that is centered on the support frame 70 between the support tubes 62, the step could be located off-center outside of the support tubes 62, if so desired.

The pivot mounts 73 on the support frame 70 connect to and mount the pivotable molding 54 about a pivot axis 77. More specifically, the pivotable molding 54 may be formed from plastic, or other suitable material, such as, for example, a thirty percent glass filled polypropylene. The release levers 82 may be molded into the pivotable molding 54 while it is being formed or affixed thereto after forming by, for example, friction welding. Each release lever 82 includes a base 86 that is adjacent to the pivotable molding 54, a pivot flange 88 extending from one end of the base 86, and a release flange 90 extending from the other end. Each pivot flange 88 pivotally mounts about one of the pivot mounts 73 and is secured with a hinge rod 92. The pivot flange 88, then, will allow the pivotable molding 54 to pivot about the pivot axis 77. Each release flange 90 is offset from the pivot axis 77 and is connected to one of the latch actuation rods 80. Thus, when the pivotable molding 54 is pivoted, the release flanges 90 will pull up on the latch actuation rods 80. The latching assemblies 60 unlatch, allowing the support tubes 62 to slide relative to the guide rails 58, when the latch actuation rods 80 are pulled upwards, and re-engage when the latch actuation rods 80 are released.

The pivotable molding 54 may be molded with the plastic being the desired final color so that it does not have to be painted. The pivotable molding 54 may also include a handle pocket 94 that is molded into the rear surface of the pivotable molding 54. The handle pocket 94 provides for ease of gripping and pivoting the pivotable molding 54 when deploying the supplemental tailgate 22. The pivotable molding 54 also may have an overall width that is just smaller than the gap 43 formed between the two tailgate moldings 50, 52, and has a top surface that is flush with the top surfaces of the two tailgate moldings 50, 52. Additionally, if so desired, the two tailgate moldings 50, 52 may include recessed flanges (not shown) that nest under the edges of the pivotable molding 54. Accordingly, the supplemental tailgate 22, when in its fully retracted position, will blend-in with the tailgate 20, having an appearance that is very similar to a tailgate that does not include a supplemental tailgate. Thus, the supplemental tailgate 22 can be included without detracting from the esthetically pleasing look of the vehicle, and, moreover, the pivotable molding 54 will still allow for cargo to be slid into and out of the box 26 over the top of a closed tailgate 20 without creating paint scratch concerns.

Figure 4:
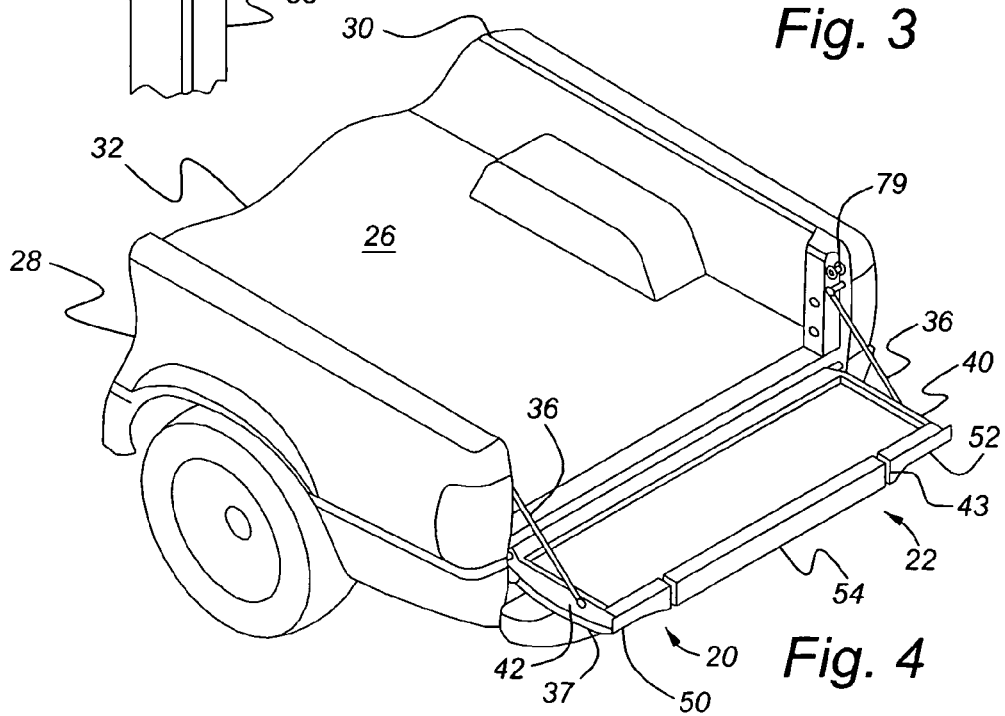
FIG. 4 is a partial perspective view similar to FIG. 1, but with the tailgate shown in its open, generally horizontal position.

The operation of the supplemental tailgate 22 will now be described. The supplemental tailgate 22 may be easily released from its stowed position within the tailgate 20 while the tailgate 20 is in its open or closed position. Although, for the most advantageous use of the supplemental tailgate functions, the tailgate 20 will be in its horizontal open position (as best seen in FIG. 4). One may, if so desired, employ an extra latching mechanism (not shown) that may only allow release of the supplemental tailgate 22 when the tailgate is in its horizontal position.

To deploy the supplemental tailgate 20 from its stowed position, one grasps the pivotable molding 54 and pivots it relative to the pivot axis 77. This will cause the release flanges 90 to pull on the latch actuation rods 80, which, in turn, will pull on the latch housings 78 against the bias of the latch return springs 85. As the latch housings 78 move upward, the internal flanges 99 slide along the release ramps 100, which causes the latch blades 87 to begin sliding against the bias of the latch blade springs 95. As the latch blades 87 slide outward, the retention tabs 96 slide out of the engagement slots 61, 98, thus releasing the movable frame portion 56 and allowing it to slide relative to the guide rails 58. Springs (not shown) may be provided to bias the movable frame portion 56 away from the tailgate frame 37 when the latching assemblies 60 are released, but are not necessary for operation of this invention.

Figure 5:
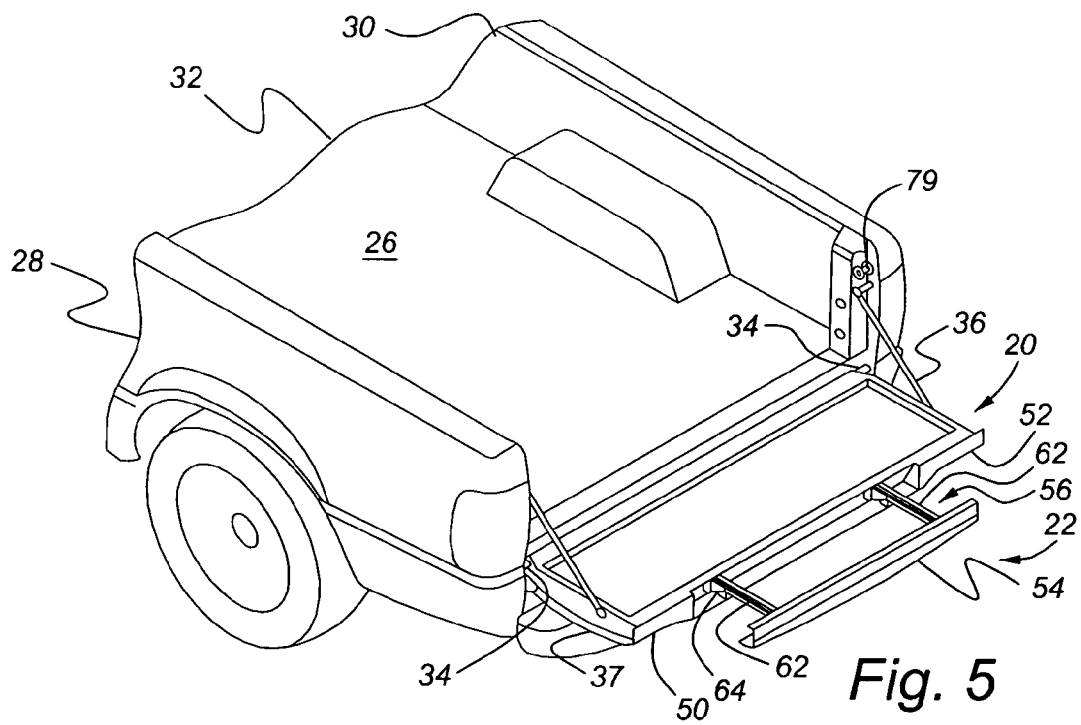
FIG. 5 is a partial perspective view similar to FIG. 4, but with the supplemental tailgate shown in a partially extended position.

One then pulls on the supplemental tailgate 22 to telescopically slide the support tubes 62 relative to the guide rails 58, while allowing the pivotable molding 54 to pivot back into its latch engaged position. Once the movable frame portion 56 is slid out to a predetermined extended position relative to the tailgate 20 (as best seen in FIG. 5), the retention tabs 96 on the lower end of the latch blades 87 will engage an engagement slot 53 or engagement slot 61 (depending upon how far the support tubes 62 are slid prior to releasing the pivotable molding 54), thus fixing the movable frame portion 56 relative to the guide rails 58. Also, at these extended positions, the support tubes 62 still remain partially within the guide rails 58 so that the two will not pivot relative to one another. With the tailgate 20 in its horizontal open position, the supplemental tailgate 22 is now in its bed extender position. While only a limited number of bed extender positions are discussed herein, the supplemental tailgate 22 may have multiple bed extender positions by providing additional engagement slots, if so desired.

The pivotable molding 54 may then be pivoted again to release the latching assemblies 60 once more. One may then pull the supplemental tailgate 22 out to its fully extended position relative to the open tailgate 20. In this fully extended position, the support tubes 62 will be pulled out of the guide rails 58, with the hinge pins 66 engaged in the slots 65 of the pivot brackets 64.

Figure 6:
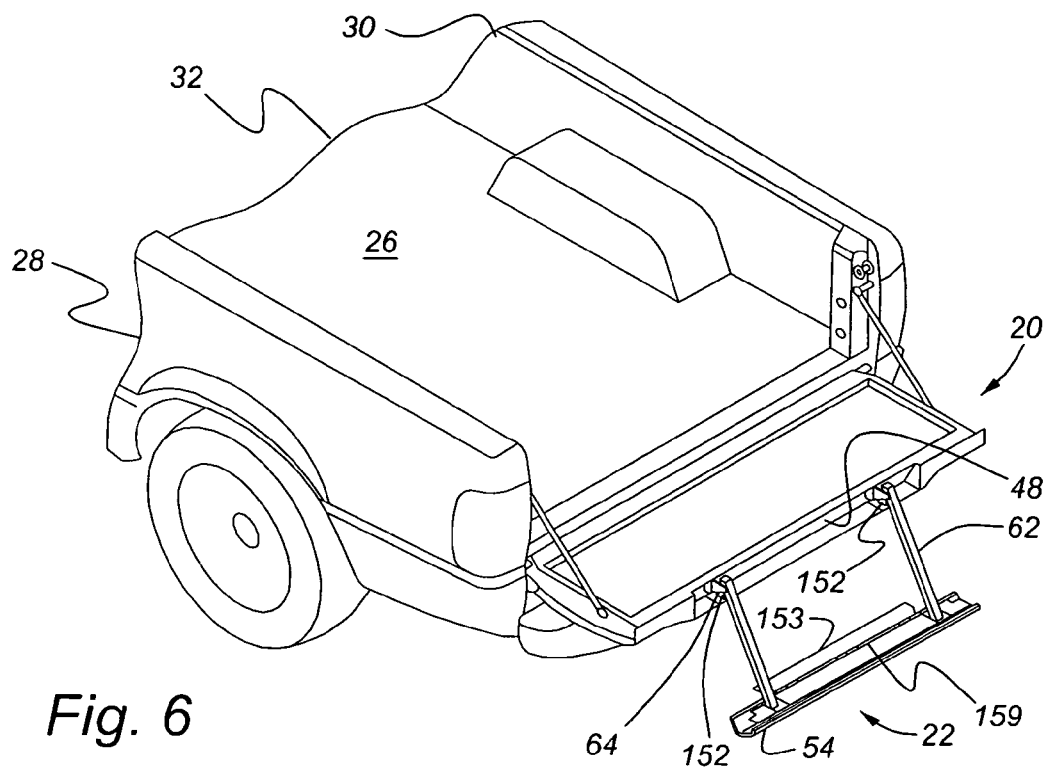
FIG. 6 is a partial perspective view similar to FIG. 4, but with the supplemental tailgate shown in a fully extended, and downwardly rotated position, and with a flip out step shown in an open position.
Figure 7:
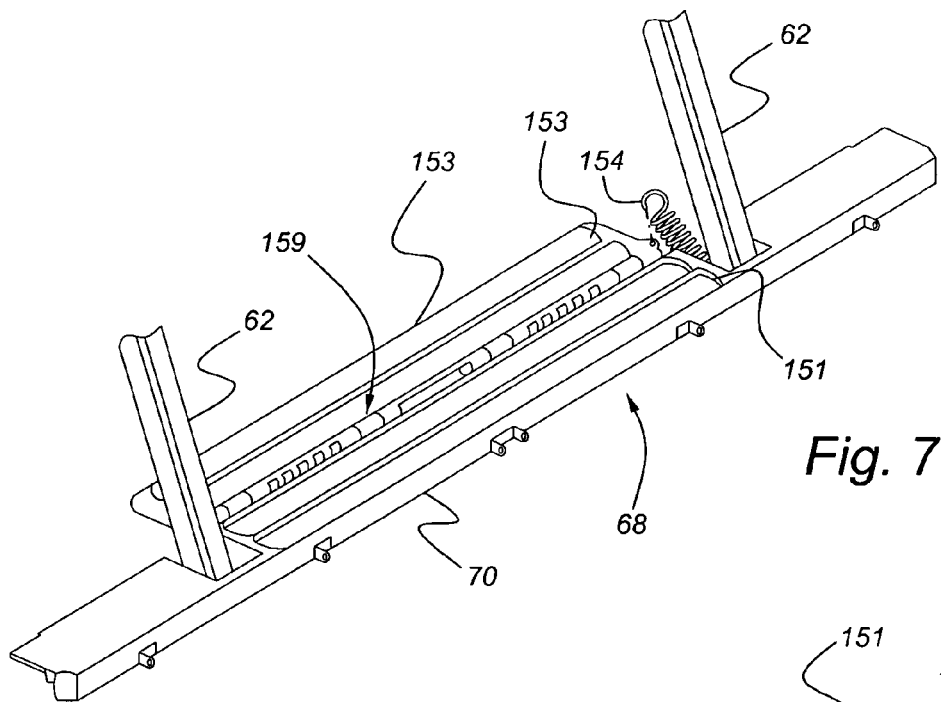
FIG. 7 is a partial perspective view, on an enlarged scale, of the supplemental tailgate as oriented in FIG. 6, but without the pivotable molding illustrated.
Figure 8:
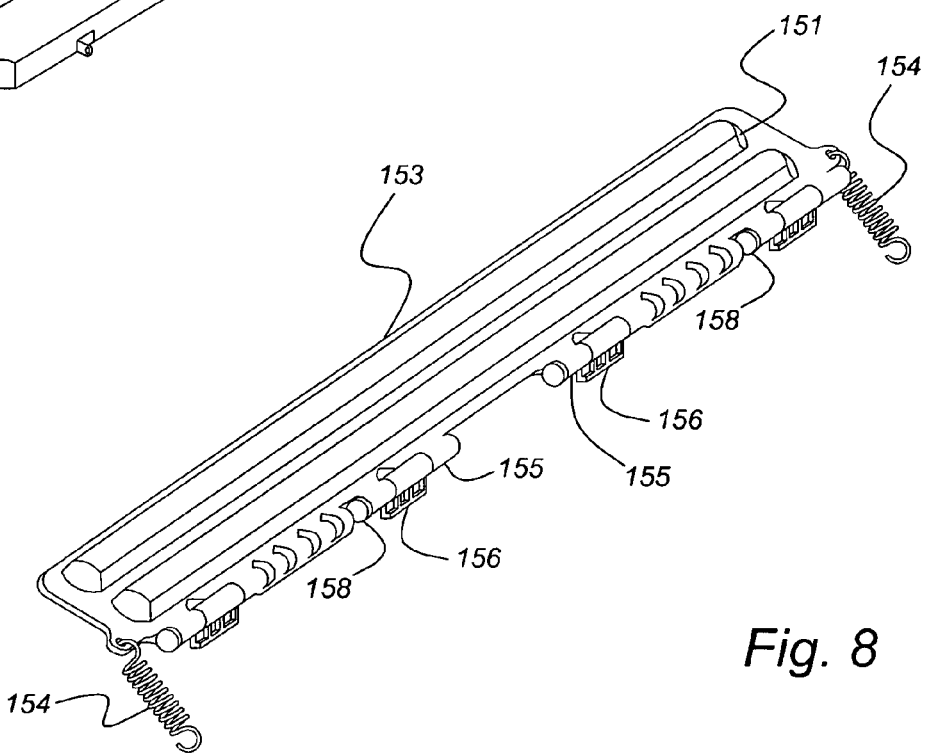
FIG. 8 is a perspective view, on an enlarged scale, similar to FIG. 7, but only illustrating the flip out step components.
Figure 9:
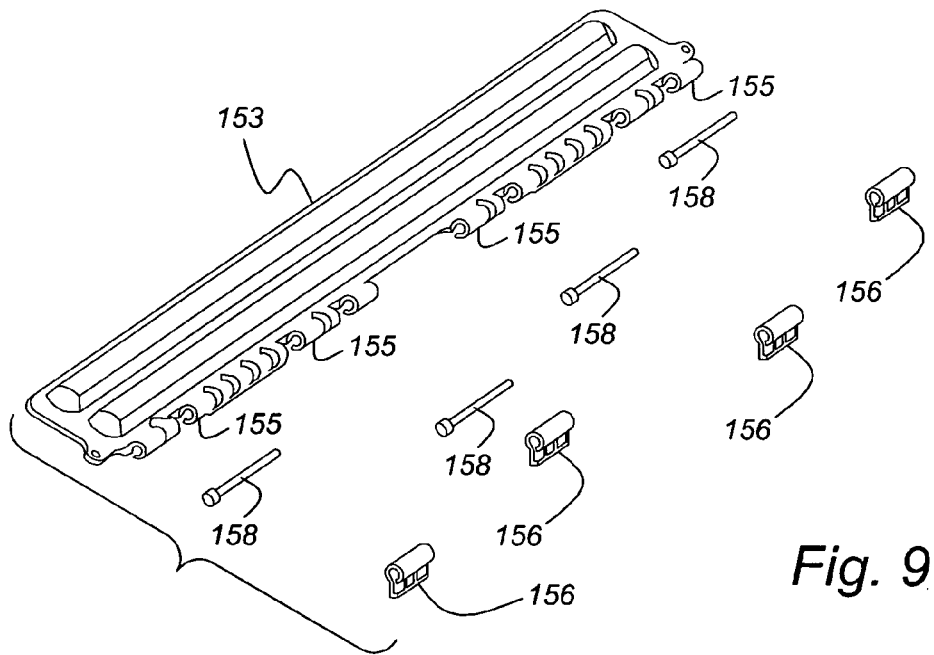
FIG. 9 is an exploded, perspective view of the flip out step components in accordance with the present invention.
Figure 10:
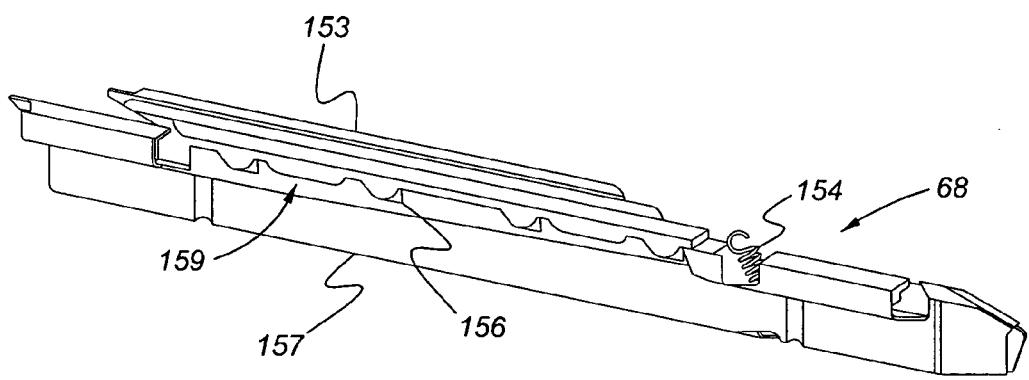
FIG. 10 is a front perspective view of the flip out step and some of the supplemental tailgate components, in accordance with the present invention.
Figure 11:
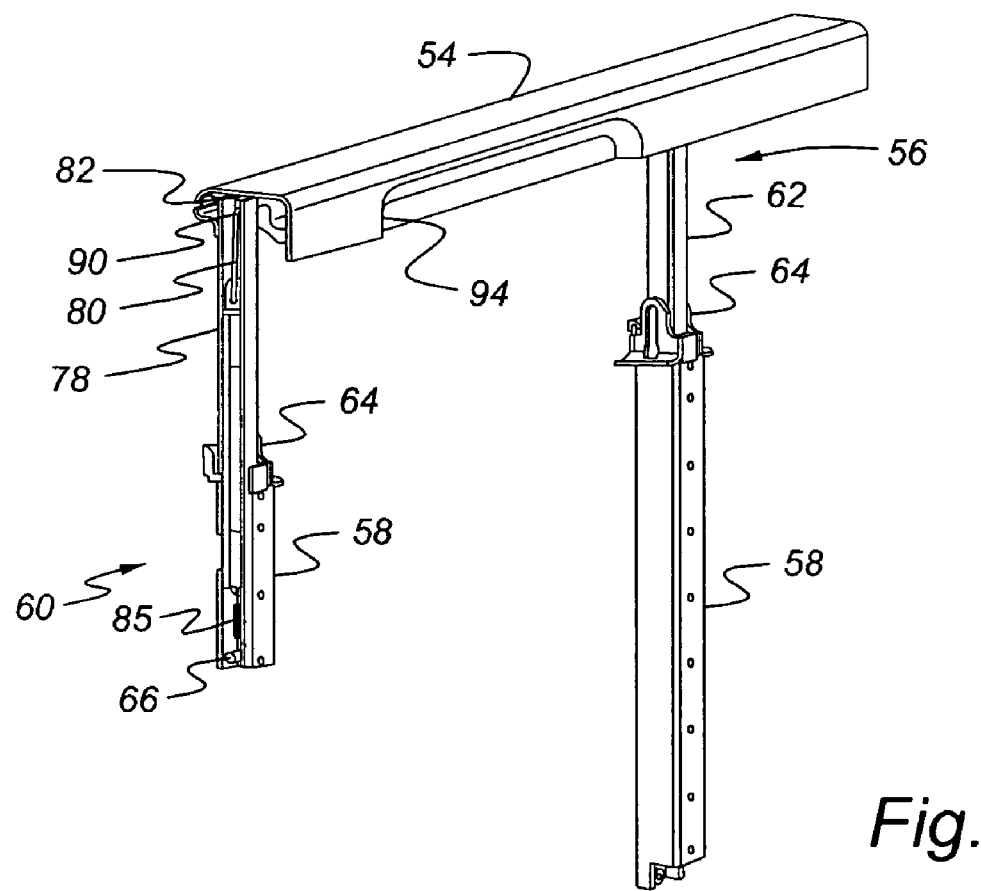
FIG. 11 is a rear perspective, partially sectioned view similar to FIG. 3, but with the section cut taken at a different location.
Figure 12:
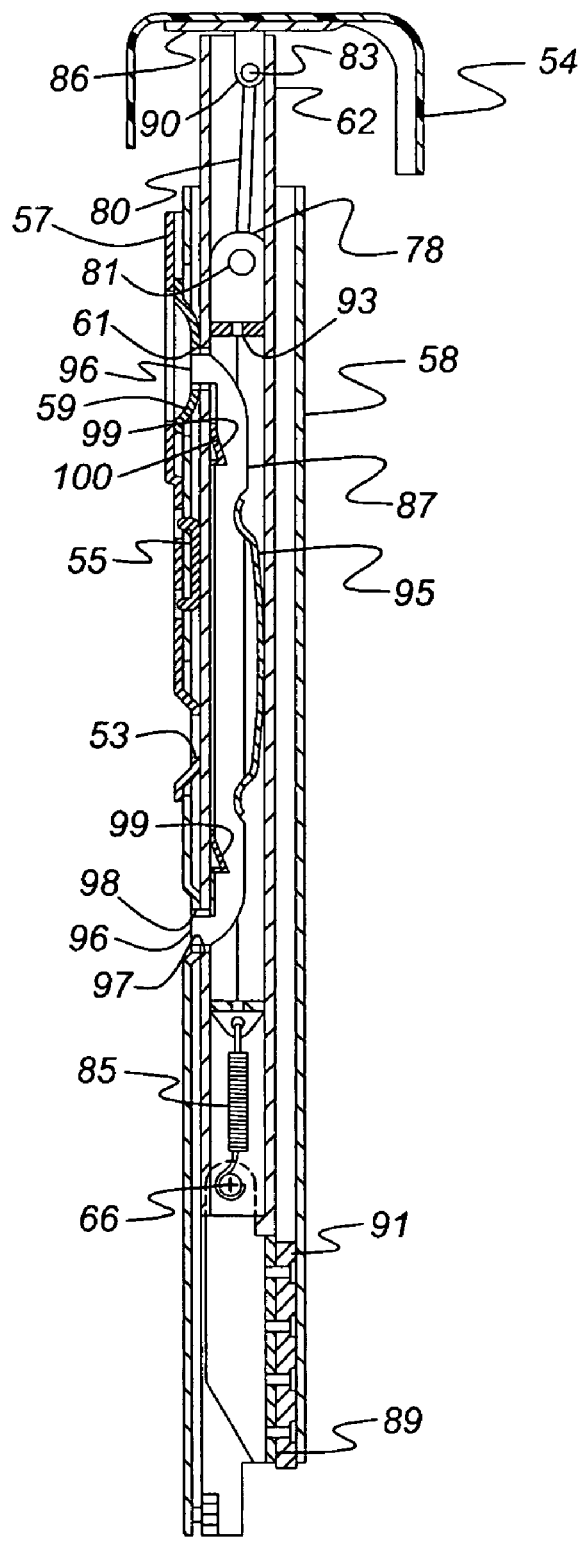
FIG. 12 is a sectional view of the supplemental tailgate in accordance with the present invention.

The movable frame portion 56, from its fully extended position, can be pivoted downward until the support tubes 62 engage the structural stops 152. The size and location of the structural stops 152 determines the downward angle at which the support tubes 62 engage the structural stops 152. This angle can be any angle that is deemed most convenient for positioning of an assist step. After the frame portion 56 is in this downward extending, generally vertical orientation, one then uses a hand or foot to pivot the flip step 153 from its closed position resting against the support frame 70 to its open position generally flush and coplanar with the support frame 70 and extending toward the vehicle 24. The supplemental tailgate 22 is now in its step assist position (as best seen in FIG. 6). The flip step 153 and the support frame 70 act together to form a step that is wide enough to be comfortable for a foot when one is standing thereon. If so desired, one may also provide traction grooves 151 or apply a tape or a similar traction device to the upper surfaces of the support frame 70, flip step 153 or both in order to improve the traction of a person standing on the step.

In this downward position, the pivotable molding 54 is on the underside of the movable frame portion 56, so it will not be stepped-on and damaged by the operator. Also, the support tubes 62 may be short enough that the pivotable molding 54 is spaced above the ground upon which the vehicle is standing. In this way, the molding 54 will not be scraped or damaged by contact with the ground, and the flip step 153 and support frame 70, being higher off of the ground, will provide a better assist step function.

Performing the deployment operation generally in reverse will allow one to easily stow and latch the supplemental tailgate 22 back into the vehicle tailgate 20. Hence, an easy to operate and ergonomic supplemental tailgate 22 is provided for the vehicle 24.

Figure 13:
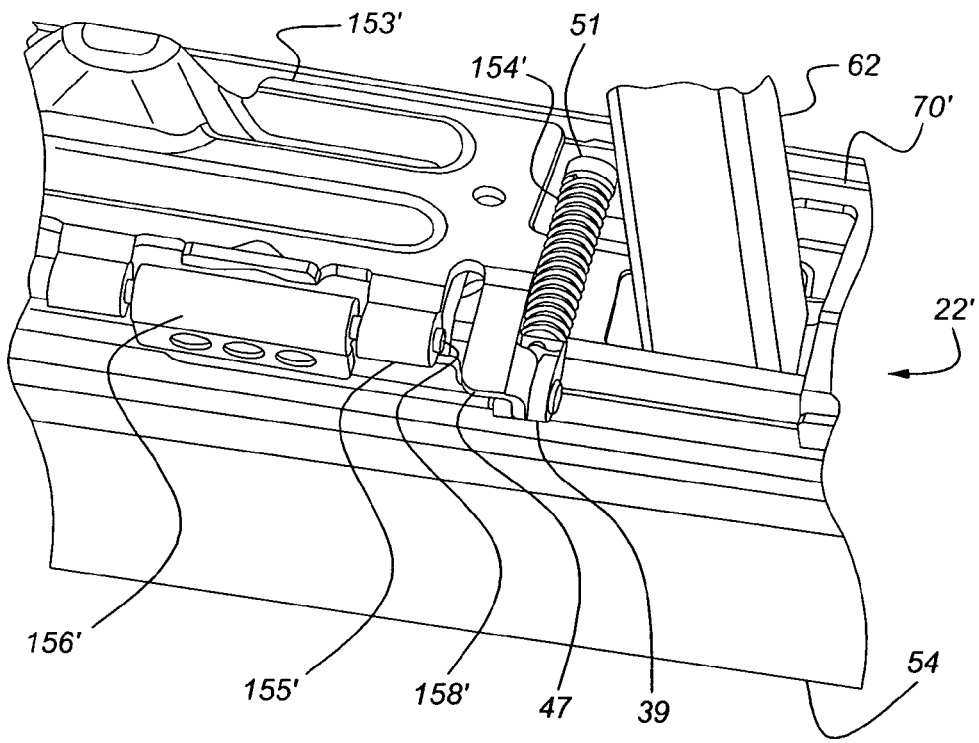
FIG. 13 is a perspective view of a portion of the supplemental tailgate in accordance with a second embodiment of the present invention.
Figure 14:
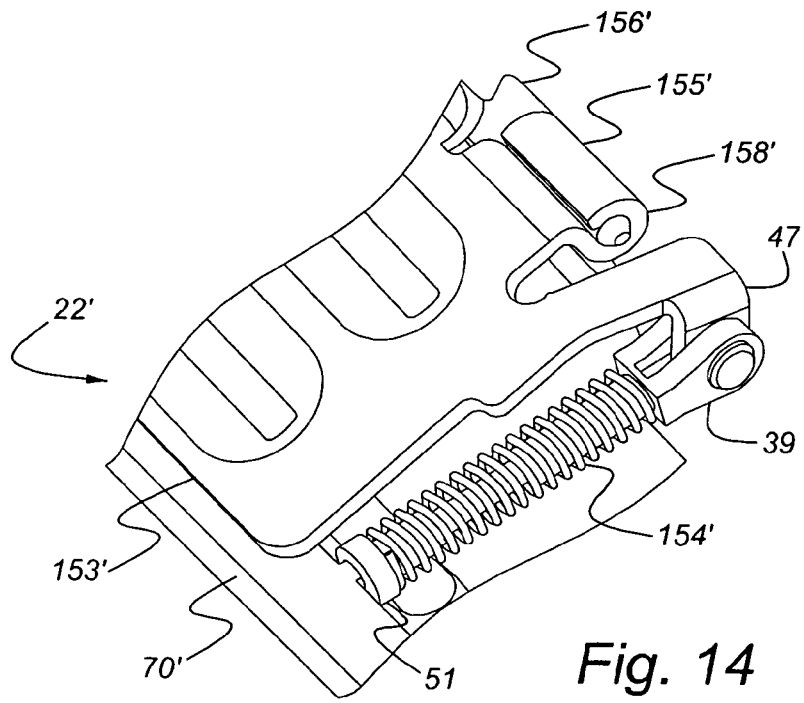
FIG. 14 is a perspective view, similar to FIG. 13, but of a different portion of the supplemental tailgate in accordance with the second embodiment of the present invention.

FIGS. 13 and 14 illustrate a second embodiment of the present invention. In these two figures, the supplemental tailgate 22' is shown in its downwardly pivoted position, supported vertically by the support tubes 62 (only shown in FIG. 13), and with the pivotable molding 54 (only shown in FIG. 13) now on the underside of the supplemental tailgate 22'. The flip step 153' is shown in its stowed position in both figures.

In this second embodiment, compression springs are employed for the flip step springs 154' rather than the tension springs illustrated in the first embodiment. A first end of each of the flip step springs 154' coils around a respective one of a pair of spring shafts 51, which each mount on the support frame 70'. A second end of each of the flip step springs 154' coils around a respective one of a pair of spring fittings 39. The spring shafts 51 are each telescopically received in a respective one of the spring fittings 39, which allows the springs 154' to flex when they are put under a compression load. Each spring fitting 39 is also pivotally fastened to a spring flange 47 that extends from the flip step 153'.

The axis about which the spring fitting 39 pivots is offset from the axis about which the hinge pins 158' cause the hinge bosses 155' to pivot relative to the step hinges 156'. The offset is located so that the flip step springs 154' are in greater compression when the flip step 153' is partially between a fully open position and a fully closed position than when it is in the fully open or fully closed position. Consequently, as with the tension springs in the first embodiment, the compression flip step springs 154' will bias the flip step 153' into one of a fully open or a fully closed position.

While certain example embodiments of the present invention have been described in detail, those familiar with the art to which this invention relates will recognize various alternative designs and embodiments for practicing the invention as defined by the following claims.

What is claimed is:

1. A tailgate assembly for use with a motor vehicle having a pair of spaced, generally vertical side walls and a generally horizontal bed extending therebetween, the tailgate assembly comprising:

a tailgate frame defining a generally hollow cavity therein adapted to pivotally mount generally between the side walls and being operable in a generally horizontal open position; and a supplemental tailgate including a guide system secured generally within the hollow cavity, a movable frame assembly having two telescoping supports extendable from, pivotable relative to, and retained by the guide system, a cross member connected to the two telescoping supports and extending therebetween, and a flip step pivotally connected to the cross member, with the flip step pivotable between a first position resting against the cross member and a second position extending outward from the cross member.

2. The tailgate assembly of claim 1 wherein the tailgate frame further includes at least one structural stop mounted thereto, with the at least one structural stop located adjacent to at least one of the two telescoping supports to thereby limit the pivoting of the movable frame assembly relative to the guide system.

3. The tailgate assembly of claim 2 wherein the at least one structural stop is two structural stops, with each of the structural stops located adjacent to a respective one of the two telescoping supports.

4. The tailgate assembly of claim 2 wherein the cross member includes a hinge portion and the flip step includes a hinge portion that operatively engages the hinge portion on the cross member.

5. The tailgate assembly of claim 4 wherein the cross member includes a step reinforcement member that extends adjacent to the hinge portion of the cross member such that the flip step will be located coplanar with the cross member when the flip step is in the second position.

6. The tailgate assembly of claim 4 wherein the supplemental tailgate includes a spring connected between the cross member and the flip step such that the flip step is biased by the spring into at least one of the first position and the second position.

7. The tailgate assembly of claim 4 wherein the cross member includes a first surface and the flip step includes a second surface, and at least one of the first surface and the second surface includes an anti-skid device.

8. The tailgate assembly of claim 1 wherein the supplemental tailgate includes a spring connected between the cross member and the flip step such that the flip step is biased by the spring into at least one of the first position and the second position.

9. The tailgate assembly of claim 1 wherein the cross member includes a first surface and the flip step includes a second surface, and at least one of the first surface and the second surface includes an anti-skid device.

10. The tailgate assembly of claim 1 wherein the two telescoping supports are spaced from each other and the flip step is located between the two telescoping supports.

11. The tailgate assembly of claim 1 wherein the guide system includes two hollow guide tubes, with each of the two telescoping supports mounted in and telescopically movable relative to a respective one of the guide tubes.

12. The tailgate assembly of claim 11 further including two pivot brackets, each having a pivot slot, with one of each of the pivot brackets mounted on a respective one of the guide tubes; and two pivot pins, one each secured to a respective one of the telescoping supports, whereby when the telescoping supports are essentially fully removed from the guide tubes, the pivot pins will engage with the pivot slots to secure each telescoping support to the respective guide tube while allowing the telescoping supports to pivot relative to the guide tubes.

13. The tailgate assembly of claim 1 wherein the motor vehicle is adapted to rest on a ground surface and the two telescoping supports are a predetermined length such that the cross member is adapted to be spaced from the ground surface when the tailgate frame is in the generally horizontal open position and the telescoping supports are pivoted downward relative to the guide system.

14. A supplemental tailgate assembly for use with a vehicle tailgate having a tailgate frame defining a generally hollow cavity therein, the supplemental tailgate assembly comprising:
a guide system including two hollow guide tubes adapted to be secured generally within the hollow cavity; and
a movable frame assembly having two telescoping supports, with each telescoping support extendable from, pivotable relative to, and retained by a respective one of the guide tubes; a cross member connected to the two telescoping supports and extending therebetween; and a flip step pivotally connected to the cross member, with the flip step pivotable between a first position resting against the cross member and a second position extending outward from the cross member.

15. The supplemental tailgate assembly of claim 14 wherein the cross member includes a hinge portion and the flip step includes a hinge portion that operatively engages the hinge portion on the cross member.

16. The supplemental tailgate assembly of claim 14 further including two pivot brackets, each having a pivot slot, with one of each of the pivot brackets mounted on a respective one of the guide tubes; and two pivot pins, one each secured to a respective one of the telescoping supports, whereby when the telescoping supports are essentially fully removed from the guide tubes, the pivot pins will engage with the pivot slots to secure each telescoping support to the respective guide tube while allowing the telescoping supports to pivot relative to the guide tubes.

17. The supplemental tailgate assembly of claim 14 wherein the supplemental tailgate includes a spring connected between the cross member and the flip step such that the flip step is biased by the spring into at least one of the first position and the second position.

18. The supplemental tailgate assembly of claim 14 wherein the cross member includes a first surface and the flip step includes a second surface, and at least one of the first surface and the second surface includes an anti-skid device.

19. A supplemental tailgate assembly for use with a vehicle tailgate having a tailgate frame defining a generally hollow cavity therein, the supplemental tailgate assembly comprising:
a guide system adapted to be secured generally within the hollow cavity; and
a movable frame assembly having two telescoping supports extendable from, pivotable relative to, and retained by the guide system; a cross member connected to the two telescoping supports and extending therebetween; a flip step pivotally connected to the cross member, with the flip step pivotable between a first position resting against the cross member and a second position extending outward from and generally coplanar with the cross member; and at least one spring connected between the cross member and the flip step such that the flip step is biased by the at least one spring into at least one of the first position and the second position.

20. The supplemental tailgate assembly of claim 19 wherein the at least one spring is two springs, with each of the two springs connected between the cross member and the flip step.

* * * * *

UNITED STATES PATENT AND TRADEMARK OFFICE
CERTIFICATE OF CORRECTION

PATENT NO.       : 6,918,624 B2  Page 1 of 1
APPLICATION NO.  : 10/969413
DATED            : July 19, 2005
INVENTOR(S)      : Miller et al.

It is certified that error appears in the above-identified patent and that said Letters Patent is hereby corrected as shown below:

Title Page should read:

(73) Assignees: Ford Global Technologies LLC, Dearborn, MI (US); Multimatic Inc., Markham (CA)

Signed and Sealed this

Twenty-second Day of May, 2007

JON W. DUDAS
*Director of the United States Patent and Trademark Office*